United States Patent
Barre et al.

(10) Patent No.: US 6,995,656 B2
(45) Date of Patent: Feb. 7, 2006

(54) SWITCHING DEVICE COMPRISING LOCAL DECODING MEANS

(75) Inventors: Philippe Barre, Le Fresne Camilly (FR); Sebastien Clamagirand, Douvres la Delivrande (FR); Nicolas Lecacheur, Caen (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 410 days.

(21) Appl. No.: 10/313,399

(22) Filed: Dec. 6, 2002

(65) Prior Publication Data

US 2003/0117271 A1    Jun. 26, 2003

(30) Foreign Application Priority Data

Dec. 11, 2001   (FR) .................................. 01 15976

(51) Int. Cl.
*H04Q 11/00*   (2006.01)
*G06F 13/00*   (2006.01)

(52) U.S. Cl. ..................... 340/14.1; 340/2.2; 340/2.27; 340/2.28; 340/2.29; 370/360; 370/380; 710/316; 710/317

(58) Field of Classification Search ............... 340/14.1, 340/2.1, 2.2, 2.24, 2.26, 2.27, 2.28, 2.29; 370/357, 359, 360, 380, 386; 398/43, 50, 398/56
See application file for complete search history.

(56) References Cited

U.S. PATENT DOCUMENTS

| | | | |
|---|---|---|---|
| 5,179,552 A | | 1/1993 | Chao ........................... 370/60 |
| 5,734,486 A | * | 3/1998 | Guillemot et al. ............ 398/54 |
| 5,818,349 A | * | 10/1998 | Dayton ...................... 340/2.27 |
| 6,580,359 B1 | * | 6/2003 | Tam ........................ 340/14.1 |
| 2003/0118032 A1 | * | 6/2003 | Barre et al. ................. 370/396 |

FOREIGN PATENT DOCUMENTS

EP    1014625 A2    6/2000

\* cited by examiner

*Primary Examiner*—Brian Zimmerman
*Assistant Examiner*—Clara Yang
(74) *Attorney, Agent, or Firm*—Adam L. Stroud

(57) ABSTRACT

The invention relates to a switching device comprising a plurality of inputs and outputs which are interconnected by a matrix of interconnection points for transmitting electric signals supplied from the inputs to the outputs via transmission lines in accordance with a predefined switching plan. The device comprises a control member for controlling the operation of the matrix with control signals and local decoding for locally decoding the control signals and for deducing the switching state of the interconnection points. Application: packet switching in optical transmissions.

5 Claims, 4 Drawing Sheets

SWITCHING DEVICE COMPRISING LOCAL DECODING MEANS

Figure 1:
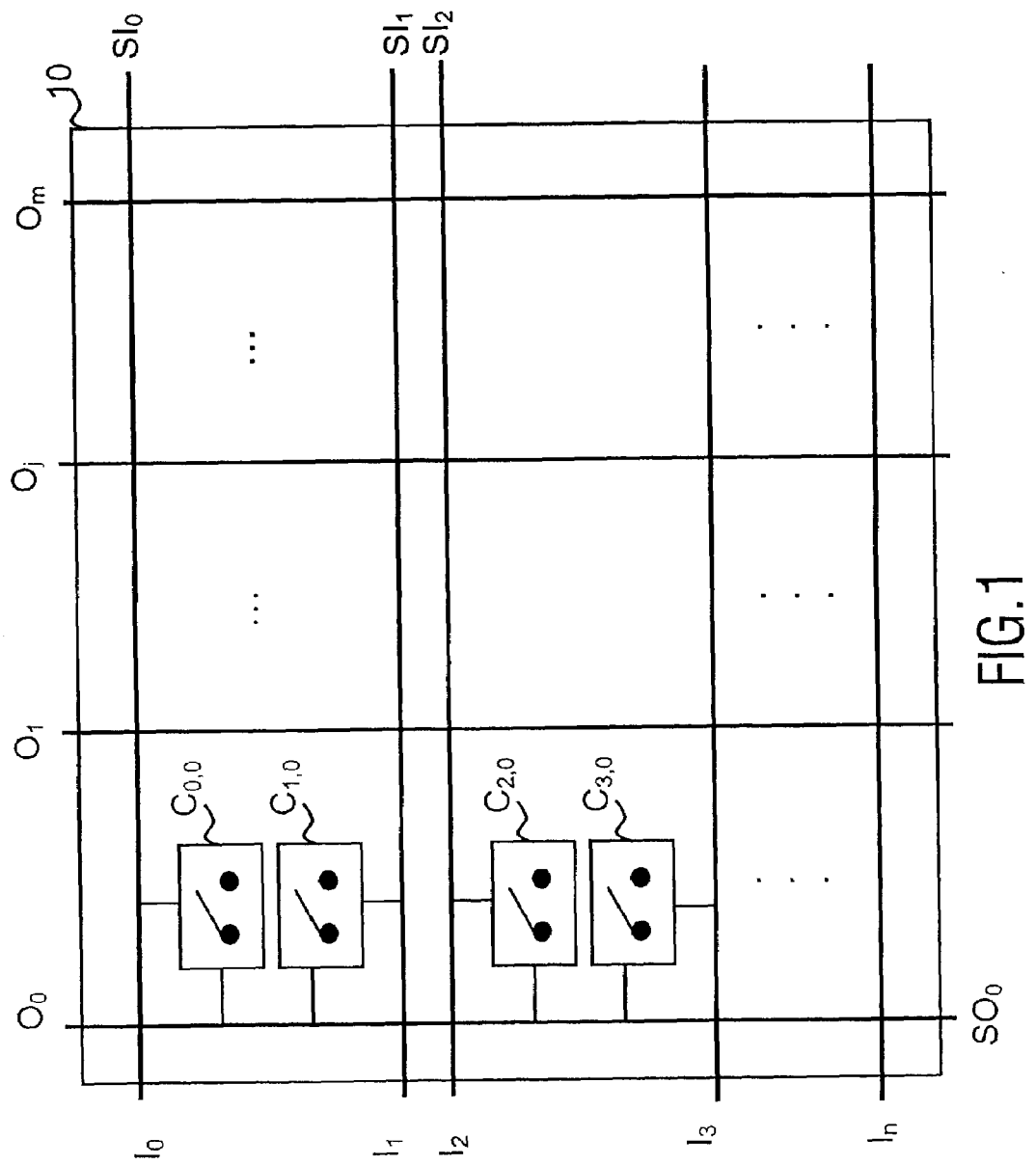

The invention relates to integrated circuits dedicated to high rate transmissions. Particularly, it relates to a switching device comprising a plurality of inputs and outputs which are interconnected by an interconnection point matrix for switching electric signals supplied from said inputs to said outputs in accordance with a predefined switching plan, the device comprising:
- a control member for controlling the operation of the matrix by means of control signals, and
- decoding means for decoding said control signals and for deducing the switching state of said interconnection points.

The invention also relates to an integrated circuit comprising such a device. It also relates to a digital transmission system comprising an autoswitch incorporating a switching device for interconnecting a plurality of transmitters and receivers. Finally, it relates to an autoswitch of a digital transmission system.

The invention finds numerous applications, notably in transmission systems using optical connections. It is particularly advantageous in the application of high rate packet switching.

The integrated circuits used in optical transmissions convey electric signals at high rates, for example, of the order of about ten gigabits per second. At these transmission rates, the connections between the inputs and outputs of the circuit are subjected to line losses which cannot be ignored and have a detrimental influence on the performance of the circuit. Any reduction of the size of the circuit and hence the number and length of these connections contributes to an improvement of the performance of the circuit by diminishing the line losses. These effects are even more remarkable in high rate applications because the transmission lines are traversed by high frequency currents, which produces a particular effect, known as the skin effect, increasing the resistivity of the materials used.

European patent specification EP 1 014 625 describes a switching device of the type mentioned in the opening paragraph, which is intended to optimize the ratio between the size of the switching matrix and its capacity in number of inputs and outputs. The device comprises a plurality of switching cells arranged in a cascade configuration for forming a multistage matrix network in which each switching cell has two inputs and two outputs. The cells are interconnected in a cascade configuration at several levels or switching stages, such that any input of a cell can be switched to any output of another cell via one or several switching stages in accordance with the interconnection plan of the matrix. The multistage switching matrix described in the above-cited patent specification is relatively complex to realize and control because there is no direct unique connection between all the inputs and all the outputs of the matrix. The realization, control and programming of such a matrix, when in use, for example, in high rate packet switching applications is complex enough to be used. Moreover, the construction of such a matrix in a cascade configuration of several stages is detrimental for the performance of the circuit, notably in terms of jitter.

It is an object of the invention to provide a switching device having a reduced bulkiness for high-rate applications, which device has a better performance and is easier to realize and control than the device described in the above-cited patent specification. The invention modifies the management of different components of the matrix so as to re-use certain components that are already present by adapting them in such a way that, due to the fact of repetition of these components in the matrix, a considerable reduction of the total space occupied by the matrix is obtained.

To this end, a device of the type described in the opening paragraph is provided, which is characterized in that said decoding means comprise a local decoder having two outputs per pair of interconnection points for locally decoding said control signals at the level of said interconnection points. The local decoding of the control signals provides the possibility of reducing the number of control connections which are required between the control member and the interconnection points, which diminishes as much space occupied by these control connections. Moreover, this configuration provides the possibility of using a single decoder having two outputs per pair of interconnection points. This decoder may have a size which is substantially smaller than the sum of the two decoders which are capable of realizing the same decoding operation.

These and other aspects of the invention are apparent from and will be elucidated, by way of non-limitative example, with reference to the embodiment(s) described hereinafter.

Figure 2:
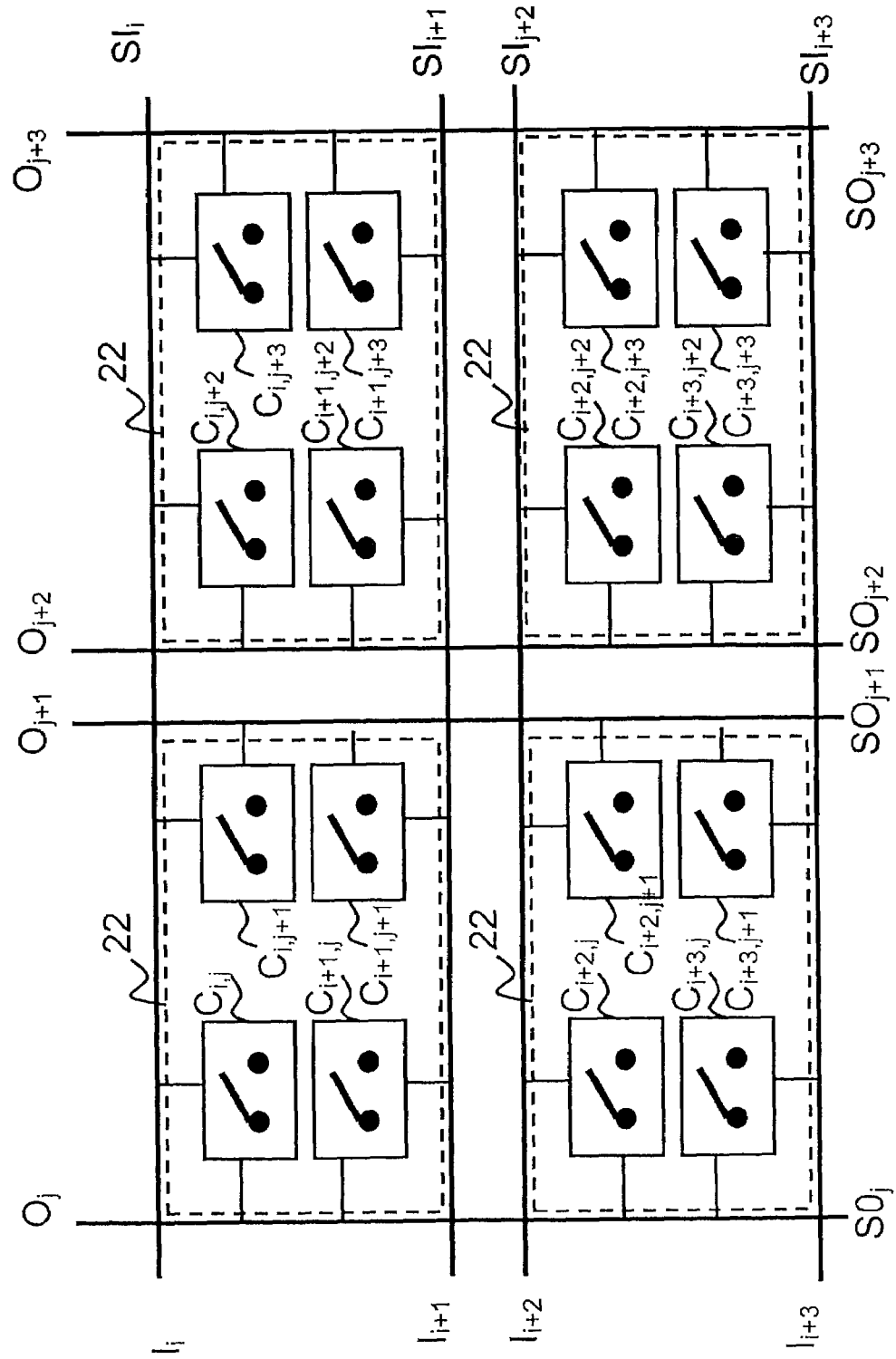
Figure 3:
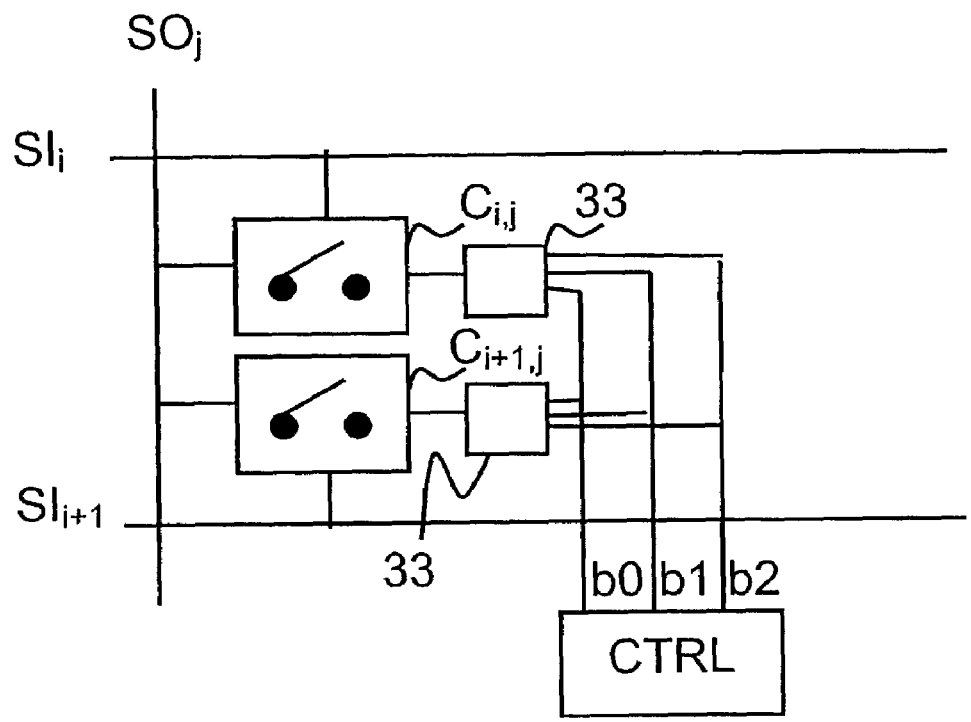
Figure 4:
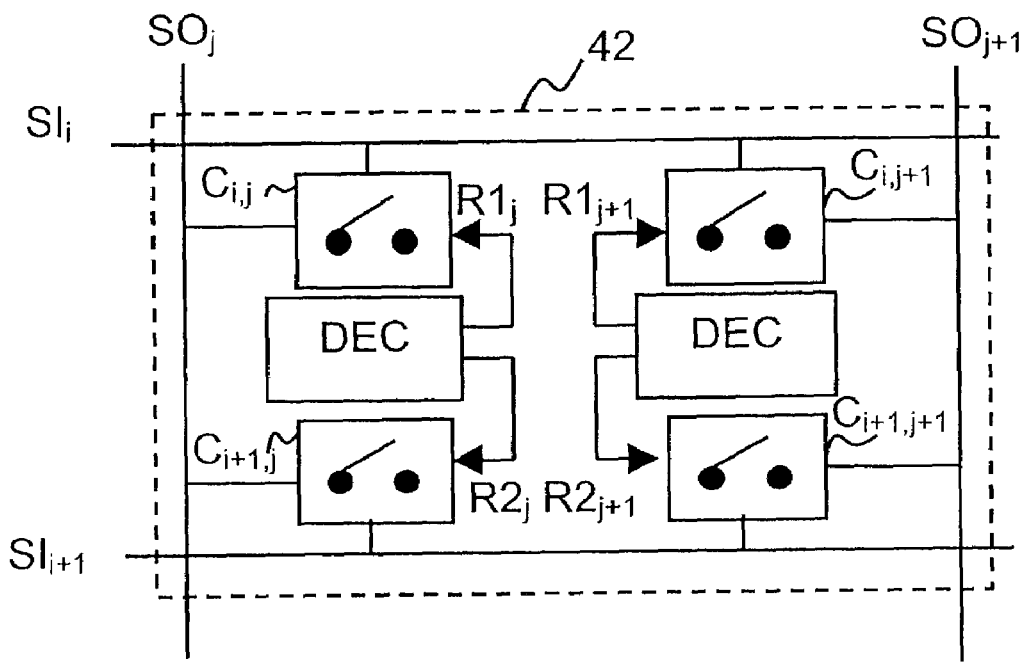
Figure 5:
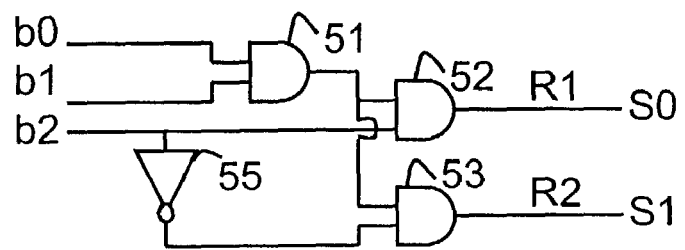
Figure 6:
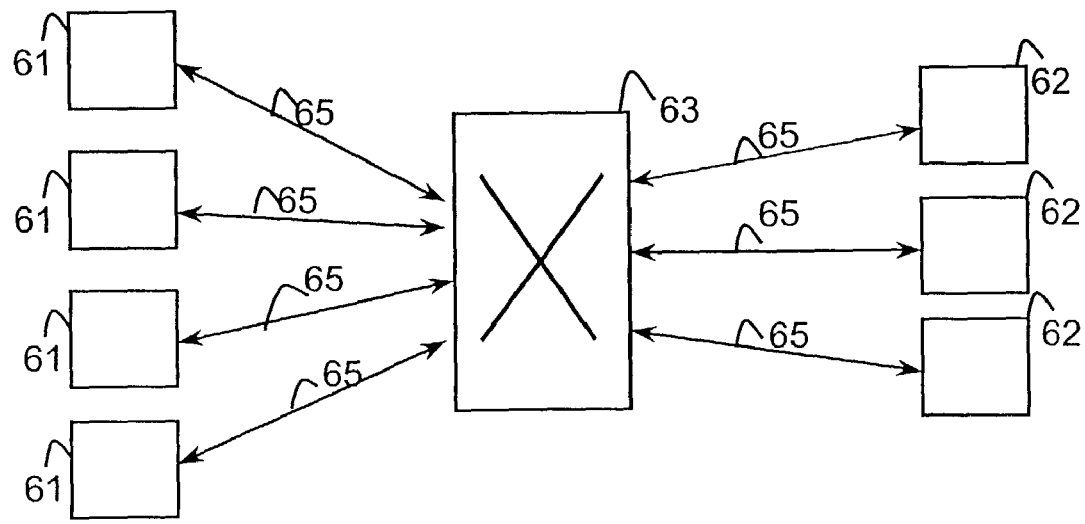

In the drawings:

FIG. 1 is a functional diagram illustrating an example of the device in accordance with a first embodiment of the invention, FIG. 2 is a functional diagram illustrating an example of the device in accordance with a second embodiment of the invention, FIG. 3 is a functional diagram illustrating a detail of the embodiment of the device according to the invention, FIG. 4 is a functional diagram illustrating a detail of the embodiment shown in FIG. 2, FIG. 5 is a functional diagram illustrating an embodiment of a local decoder in a device according to the invention, FIG. 6 is a functional diagram illustrating an example of using the invention.

FIG. 1 shows an example of the switching device according to the invention. It comprises a rectangular matrix 10 of the n×m type, where n represents the number of inputs, denoted $I_0$ to $I_n$, and m represents the number of outputs of the matrix, denoted $O_0$ to $O_m$. Each input and each output are connected to a distinct transmission line. The transmission lines are interconnected at the level of interconnection points constituting switching cells of the matrix, denoted $C_{00}$ to $C_{nm}$, the first index referring to the index of the inputs $I_0$ to $I_n$ and the second index referring to the index of the corresponding outputs $O_0$ to $O_m$. Each transmission line with the index i or j at the input or at the output of the matrix, is composed of a signal path, denoted $SI_i$ or $SO_j$, respectively, for conveying an electric signal from an input $I_i$ or to an output $O_j$ of the matrix. The interconnection points or switching cells $C_{i,j}$ have the function of switching the signal path $SI_i$ corresponding to the input $I_i$ to the signal path $SO_j$ corresponding to the output $O_j$.

A control member (not shown) is provided to control the operation of the matrix by means of predetermined control signals in accordance with a predefined switching plan. At a given instant, an output can only be connected to a single input by a unique interconnection point set to a first switching state, referred to as active state, under the control of the control member, while all the other interconnection points which are capable of connecting other inputs to the same output are set to a second switching state, referred to as inactive state. Decoding means (not shown) are also provided to decode the control signals and deduce the switching state of the interconnection points.

For simplicity, the interconnection points are shown in FIG. 1 by simple two-way switches. However, the type of switch used for performing the function of the interconnection points is not limited to the switch $C_{i,j}$ shown in FIG. 1. For the same purpose of simplifying the Figures, the signal paths are represented by a single line. For optical transmissions, each signal path may be constituted by two distinct parallel differential paths. The principle of the invention as described with reference to all the Figures also applies to differential transmission lines.

In accordance with this principle, the interconnection points $C_{i,j}$ are pairwise arranged in the matrix, i.e. no transmission lines separate the two interconnection points or switching cells of the pair considered. In FIG. 1, the switching cells $C_{0,0}$ and $C_{1,0}$, on the one hand, and $C_{2,0}$ and $C_{3,0}$, on the other hand, are regrouped in pairs separated by the transmission lines corresponding to the two inputs of the matrix with the successive indices $I_1$ and $I_2$. The two pairs are connectable in this case to one and the same output transmission line $SO_0$. The same configuration may be reproduced by pairwise regrouping the switching cells connected to the inputs having subsequent indices, for example, the inputs $I_3$ and $I_4$, subsequently $I_5$ and $I_6$ and so forth. The same principle also applies to the other dimension of the matrix by pairwise regrouping interconnection points of the type $C_{i,j}$ and $C_{i,j+1}$, on the one hand, and $C_{i,j+2}$ and $C_{i,j+3}$, on the other hand, which are connectable to one and the same input transmission line of the type $SI_i$ and to outputs with successive indices $SO_j$ and $SO_{j+1}$, on the one hand, and $SO_{j+2}$ and $SO_{j+3}$, on the other hand.

This embodiment provides the possibility of realizing a gain of place in the matrix, notably at the level of decoding the control signals applied to the cells from the control member for controlling the switching state. The advantages of this embodiment will be explained in greater detail in the following description with reference to FIGS. 3 and 4.

In accordance with a preferred embodiment of the invention, shown diagrammatically in FIG. 2, the interconnection points are regrouped in complex cells 22 of four interconnection points. FIG. 2 shows only a part of an embodiment of a switching matrix 10 in accordance with the preferred embodiment of the invention, comprising four adjacent complex cells. In accordance with this advantageous embodiment, the principle of the invention described with reference to FIG. 1 is applied in the two dimensions of the matrix at the level of the input and output transmission lines. The same elements are denoted by the same references as in FIG. 1. This configuration of complex cells of 4 interconnection points allows a gain of place of a pair of local decoders per complex cell of 4 interconnection points as is described with reference to FIG. 4.

FIG. 3 illustrates a part of a device in accordance with a particular embodiment of the invention. Half of the complex cell 22 illustrated in FIG. 2 is shown in FIG. 3. This half corresponds to a pair of interconnection points or basic cells $C_{i,j}$ and $C_{i+1,j}$ associated with one and the same output transmission line $SO_j$. A control member CTRL is provided to control the operation of the matrix by means of the predetermined control signals. Decoding means 33 are provided to decode the control signals and to deduce the switching state of the interconnection points. The decoding means 33 comprise local decoders associated with the interconnection points so as to locally decode the control signals applied by the control member at the level of the interconnection points. In the illustrated example, the control signals are binary signals and the decoders 33 are binary decoders. The binary decoders 33 are connected to the control member by means of distinct binary connections of the transmission lines for conveying the binary control signals from the control member CTRL to the binary decoders 33. In the example shown in FIG. 3, a number N of distinct binary connections from the control member are provided to control a number of interconnection points which is maximally equal to $2^N$. In this example, N=3.

FIG. 4 illustrates the preferred embodiment of the invention already described with reference to FIG. 2. FIG. 4 shows a detail of FIG. 2 corresponding to a complex cell 22 denoted by reference numeral 42 in FIG. 4. Cell 42 comprises a pair of binary decoders DEC associated with two pairs of interconnection points. The first pair of points comprises the points $C_{i,j}$ and $C_{i+1,j}$. The second pair comprises the points $C_{i,j+1}$ and $C_{i+1,j+1}$. Each decoder DEC always comprises N inputs (not shown), but this time, each binary decoder comprises 2 outputs for decoding the control signals received on the N binary connections intended for the 2 interconnection points of each corresponding pair. Each decoder deduces a first result $R1_j$ and $R1_{j+1}$, respectively, intended to control the first interconnection point of each pair. The decoders also comprise inversion means (not shown) for inverting the control signal on at least one of the N binary connections with respect to the control signal used to provide the first result. Each decoder thus obtains a second result $R2_j$ and $R2_{j+1}$, respectively, intended to control the second interconnection point of the corresponding pair. For reasons of clarity of the Figures, neither the control connections nor the control member CTRL are shown in FIG. 4. However, these connections are present for each pair of interconnection points between each decoder DEC associated with one pair of interconnection points and the control member CTRL, as illustrated in FIG. 3.

FIG. 5 shows by way of indicative and non-limitative example an embodiment of a decoder DEC as shown in FIG. 4. The decoder comprises two logic AND gates, denoted 51 to 53 for connecting 3 inputs, denoted b0, b1 and b2 to two outputs, denoted S0 and S1. The 3 inputs b0, b1 and b2 are connected to the control member (not shown) via the N control connections illustrated in FIG. 3. The 2 outputs S0 and S1 are intended to provide the two binary control results, $R1_j$ or $R1_{j+1}$, on the one hand, and $R2_j$ or $R2_{j+1}$, on the other hand, for controlling a pair of interconnection points $C_{i,j}$ and $C_{i+1,j}$ or $C_{i,j+1}$ and $C_{i+1,j+1}$ which are connectable via a transmission line to one and the same output of the switching matrix, $O_j$ or $O_{j+1}$, in accordance with the example shown in FIG. 4. Two inputs b0 and b1 are connected at the input of a first AND gate 51 whose output is applied to an input of a second and a third AND gate 52 and 53, respectively. The third input b2 is received at the input of the second AND gate 52 for providing a first control result R1 intended for the first interconnection point $C_{i,j}$, by realizing a logic AND with the output of the first AND gate 51. Inversion means 55 are provided to invert the signal received at the third input b2 and to provide said signal at the input of the third AND gate 53, which signal is inverted with respect to the signal applied to the input of the second AND gate 52 and to deduce the second control result R2 intended for the second interconnection point $C_{i+1,j}$, by realizing a logic AND with the output of the first AND gate 51. Although this is not apparent from FIGS. 3 to 5 which are not drawn on scale, such a decoder DEC having two outputs as illustrated in FIGS. 4 and 5 is less bulky than the sum of the two decoders 33 shown in FIG. 3.

A device as illustrated in FIGS. 1 to 5 may be incorporated in an integrated circuit, notably for use in an autoswitch of a telecommunication network as shown in FIG. 6. FIG. 6 shows an example of a digital telecommunication system according to the invention. The system comprises a switching device of the type shown in the previous Figures and optical fiber connections 65 for connecting the transmitter 61 and the receiver 62 via the autoswitch 63.

The invention claimed is:

1. A switching device comprising a plurality of inputs and outputs which are interconnected by an interconnection point matrix for switching electric signals supplied front said inputs to said outputs in accordance with a predefined switching plan, the device comprising:
   a control member for controlling the operation of the matrix by means of control signals, the control signals being binary signals, and
   a decoder for decoding said control signals and for deducing the switching state of said interconnection points,
   characterized in that said decoding means comprise a local decoder, the local decoder being a binary decoder having two outputs per pair of interconnection points for locally decoding said control signals at the level of said interconnection points and characterized in that said binary decoder is connected to the control member by distinct binary connections of the transmission lines for conveying said binary control signals from the control member to said binary decoder, a number N of distinct binary connections from the control member being provided to control a number of pairs of interconnection points which is maximally equal to $2^{N-1}$.

2. A device as claimed in claim 1, wherein said binary decoder has N inputs and 2 outputs connected to a pair of interconnection points which are connectable to one and the same output of the matrix for decoding the control signals received on the N binary connections from the control member and intended for said pair of interconnection points and for deducing a first result intended to control a first interconnection point of said pair, and inversion means for inverting the control signal on at least one of the N binary connections received by the decoder with respect to the control signal used for providing said first result and for deducing a second result intended to control the second interconnection point of said pair.

3. An integrated circuit comprising a device as claimed in claim 1.

4. A digital transmission system comprising a plurality of transmitters and receivers which are interconnected by an autoswitch, characterized in that the autoswitch comprises a device as claimed in claim 1.

5. An autoswitch of a digital transmission system comprising a plurality of transmitters and receivers which are interconnected by said autoswitch, wherein said autoswitch comprises a device as claimed in claim 1.

* * * * *